(12) United States Patent
Sato et al.

(10) Patent No.: US 6,414,837 B1
(45) Date of Patent: Jul. 2, 2002

(54) ELECTROCHEMICAL CAPACITOR

(75) Inventors: Kenji Sato; Shigeki Oyama; Hiroto Kobayashi; Minoru Noguchi; Takashi Higono; Yasuhiro Matsumoto, all of Wako; Makoto Ue, Ibaraki-ken; Akiko Toriumi, Ibaraki-ken; Yasushi Ohura, Ibaraki-ken, all of (JP)

(73) Assignees: Honda Giken Kogyo Kabushiki Kaisha; Mitsubishi Chemical Corp., both of Tokyo (JP)

( * ) Notice: Subject to any disclaimer, the term of this patent is extended or adjusted under 35 U.S.C. 154(b) by 0 days.

(21) Appl. No.: 09/689,710

(22) Filed: Oct. 13, 2000

(30) Foreign Application Priority Data

Oct. 15, 1999 (JP) .............................. 11-293347
Apr. 13, 2000 (JP) ....................... 2000-112474

(51) Int. Cl.[7] ................................. H01G 9/02
(52) U.S. Cl. ................. 361/504; 361/503; 361/508; 361/529; 361/504; 29/25.3
(58) Field of Search ............................ 361/504, 306.1, 361/503, 502, 509, 433, 506, 508, 512, 529, 527; 29/25.03, 623.4

(56) References Cited

U.S. PATENT DOCUMENTS

| | | | | |
|---|---|---|---|---|
| 4,737,889 A | * | 4/1988 | Nishino et al. | 361/433 |
| 4,766,522 A | * | 8/1988 | McHardy et al. | 361/433 |
| 5,581,438 A | * | 12/1996 | Halliop | 361/502 |
| 5,953,204 A | * | 9/1999 | Suhara et al. | 361/502 |
| 5,994,000 A | * | 11/1999 | Ein-Eli et al. | 429/332 |
| 6,094,338 A | * | 7/2000 | Hirahara et al. | 361/502 |
| 6,099,960 A | * | 8/2000 | Tennent et al. | 428/367 |
| 6,205,016 B1 | * | 3/2001 | Niu | 361/503 |

FOREIGN PATENT DOCUMENTS

JP 6-173312 7/1988

OTHER PUBLICATIONS

B.E. Conway, "Transition from "Supercapacitor" to "Battery" Behavior in Electrochemical Energy Storage", J. Electrochem. Soc., vol. 138, No. 6, Jun. 1991.
A. Bond, "van der Waals Volumes and Radii", J. Physical Chemistry, 441, vol. 68, No. 3, Mar. 1964.
"Mobility and Ionic Association of Lithium and Quaternary Ammonium Salts in Propylene Carbonate and γ–Butyrolactone", UE et al, *J. Electrochem. Soc.*, vol. 141, No. 12, Dec. 1994, pp. 3336–3342.
Denki Kagaku, pp. 904–911.

* cited by examiner

*Primary Examiner*—Dean A. Reichard
*Assistant Examiner*—Nguyen Ha

(57) ABSTRACT

An electrochemical capacitor is provided having double-layer electrode elements interposed with a separator. The electrode elements being made of activated carbon and impregnated with a nonaqueous electrolytic liquid yields a capacitor with low internal resistance, greater capacitance and higher energy density. Methods for producing the activated carbon electrodes and the capacitor assembly are also described.

7 Claims, 3 Drawing Sheets

ELECTROCHEMICAL CAPACITOR

BACKGROUND OF THE INVENTION

1. Field of the Invention

The present invention relates to an electro-chemical capacitor.

2. Description of the Related Art

Electrochemical capacitors are a device for storing energy in an interface between an electrode as an electron conductor and an electrolyte as an ion conductor, and are classified into electric double-layer capacitors and pseudo capacitors (redox capacitors).

An electric double-layer capacitor comprises electrode elements as an anode and a cathode that are disposed in confronting relationship to each other with a separator interposed therebetween. Both the anode and the cathode comprise polarized electrodes made of a formed body of fibers or particles of activated carbon and a coated film of particles of activated carbon, the electrode elements being impregnated with an electrolyte. The electric double-layer capacitor stores electric charges in electric double layers produced in the interfaces between the polarized electrodes and the electrolyte.

A pseudo capacitor comprises electrode elements as an anode and a cathode that are disposed in confronting relationship to each other with a separator interposed therebetween. One of the anode and the cathode comprises a polarized electrode made of a formed body of fibers or particles of activated carbon and a coated film of particles of activated carbon, and the other of a non-polarized electrode made of a metal oxide or an electrically conductive polymer, the electrode elements being impregnated with an electrolyte. When a potential difference across the interface between the non-polarized electrode and the electrolyte is changed, electric charges move in the non-polarized electrode. The metal oxide may comprise ruthenium oxide, iridium oxide, nickel oxide, lead oxide, or the like, and the electrically conductive polymer may comprise polypyr-role, polythiophene, or the like. The pseudo capacitor of the above structure utilizes the phenomenon in which electric charges are stored in an electric double layer produced in the interface between the polarized electrode and the electrolyte, and also utilizes a pseudo capacitance due to the movement of electric charges caused by an oxidation and reduction in the vicinity of the interface between the non-polarized electrode and the electrolyte (see B. E. Conway, J. Electrochem. Soc., 138, 1539 (1991)).

The electrolytes used in the electrochemical capacitors are roughly classified into liquid electrolytes (electrolytic liquids) and solid electrolytes from their, state, and the electrolytic liquids are also classified aqueous and nonaqueous ones from a kind of solvent. The nonaqueous electrolytic liquids comprise electrolytic solutions prepared by dissolving quaternary ammonium salt, quaternary phosphonium salt, etc. into an organic solvent of propylene carbonate, etc. The solid electrolytes include a polyethylene oxide—alkali metal salt complex, $RbAg_4I_5$, etc. (Makoto Ue, "Electrochemistry", 66, 904 (1998)).

If an electrochemical capacitor uses a nonaqueous electrolytic liquid, then it has an increased withstand voltage and also has a higher energy density than if it uses an aqueous electrolytic liquid. Electrochemical capacitors using nonaqueous electrolytic liquids find use as backup power supplies for electronic devices that need to be smaller in size and lower in profile, and are also suitable for use in power applications such as electric vehicles, hybrid vehicles, and power storage devices which have been drawing attention in recent years.

When the electrochemical capacitor utilizes the phenomenon in which electric charges are stored in an electric double layer produced in the interface between the polarized electrode and the electrolyte, the energy W accumulated in the electric double layer at the time the electro-chemical capacitor is discharged at a constant current I from a voltage $V_i$ to a voltage $V_f$ is expressed by the following equation (1):

$$W = 1/2 \cdot C \cdot (V_i^2 - V_f^2) \qquad (1)$$
$$= 1/2 \cdot C \cdot [(V_0 - IR)^2 - V_f^2]$$

Therefore, in order to increase the energy density of the electrochemical capacitor which utilizes the phenomenon in which electric charges are stored in the electric double layer, it is necessary to increase the capacitance C (F) or the open-circuit voltage $V_0$ (V) or to reduce the internal resistance R (Ω). The capacitance C increases in proportion to the effective surface area of contact between the polarized electrode and the electrolyte, and is determined by a withstand voltage that is determined by the reactivity between the polarized electrode and the electrolyte. The internal resistance R includes the electric resistance of the electrode itself, and also a diffusion resistance for ions to move in pores of the electrode and a diffusion resistance for ions to move in the electrolyte. The diffusion resistance for ions to move in the electrolyte is in inverse proportion to the electric conductivity of the electrolyte. Consequently, the electrolyte is generally desired to have a high electric conductivity.

Japanese laid-open patent publication No. 63-173312 discloses, as the above electrolyte, a nonaqueous electrolytic liquid prepared by dissolving an asymmetric quaternary ammonium salt as an electrolytic salt into a nonaqueous solvent. The electrolyte is used in an electric double-layer capacitor which uses a polarized electrode of activated carbon as each of an anode and a cathode. The above publication states that an electric double-layer capacitor having a low internal resistance, a low capacitance degradation ratio under high temperature conditions, and excellent long-term reliability is produced by using an electrolytic liquid which employs the above electrolytic salt.

However, in view of stricter performance demands for electrochemical capacitors in recent years, there has been desired the development of electrochemical capacitors of lower internal resistance, greater capacitance, and higher energy density.

SUMMARY OF THE INVENTION

It is therefore an object of the present invention to provide an electrochemical capacitor of high energy density.

To achieve the above object, an electrochemical capacitor comprises electrode elements as an anode and a cathode that are disposed in confronting relationship to each other with a separator interposed therebetween, and a nonaqueous electrolytic liquid impregnated in the electrode elements, the nonaqueous electrolytic liquid being prepared by dissolving an electrolytic salt $Q^+A^-$ including cations $Q^+$ whose van der Waals volume ranges from 0.10 to 0.125 $nm^3$ into a nonaqueous solvent, the cathode comprising a polarized electrode made of activated carbon having pore diameters whose mode is at most 1.5 nm.

Since the van der Waals volume of the cations $Q^+$ ranges from 0.10 to 0.125 $nm^3$, the cations $Q^+$ can be diffused relatively freely in the pores of the activated carbon of the polarized electrode. If the van der Waals volume of the cations $Q^+$ were smaller than 0.10 nm$^3$, then they strongly interact with the molecules of the nonaqueous solvent, producing large solvation ions which prevent the cations $Q^+$ from being diffused in the pores of the activated carbon. If the van der Waals volume of the cations $Q^+$ were greater than 0.125 nm$^3$, then the cations $Q^+$ are prevented from being diffused in the pores of the activated carbon due to the size of the cations $Q^+$ themselves.

The van der Waals volume of the cations $Q^+$ can be calculated from a model in which spherical atoms of the cations $Q^+$ are bonded and superposed at a given bonding distance and angle (see M. Ue, J. Electrochem. Soc., 141, 3336 (1994)). For the radii of the spherical atoms, numerical values proposed by A. Bondi, J. Phys. Chem., 68, 441 (1964) (see "Chemical Manual, Basics II", edited by Chemical Society of Japan, H: 0.120 nm, C: 0.170 nm, N: 0.155 nm, P: 0.180 nm, As: 0.185 nm, Sb: 0.210 nm) are employed. Values measured by an X-ray diffraction analysis or a neutron diffraction analysis of an ion crystal including cations $Q^+$ are used for conformations. Alternatively, conformations obtained by "MM2 calculations" known as a molecular force field calculating program may be used. According to the MM2 calculations, the value of an obtained volume slightly differs depending on an interstitial distance for integrating the numerical value of the volume. According to the present invention, the interstitial distance is set to a constant value of 0.075 nm.

In the electrochemical capacitor according to the present invention, since the cations $Q^+$ are defined, at least the cathode of the electrode elements is constructed as the polarized electrode. With the cathode being constructed as the polarized electrode, when an electric double layer is produced in the interface between the cathode and the electrolytic liquid including the cations $Q^+$ that are diffused relatively freely in the pores of the activated carbon, the cations $Q^+$ are collected toward the electrolytic liquid, and the polarized electrode is charged by anions, making the electrochemical capacitor advantageous.

The polarized electrode for use as the cathode is made of activated carbon having pore diameters whose mode is at most 1.5 nm. Therefore, there are available many pores in which cations $Q^+$ whose van der Waals volume is in the above range can be diffused relatively freely, resulting in an increased capacitance. If the mode of the pore diameters of the activated carbon were greater than 1.5 nm, there are available fewer pores whose diameter is at most 1.5 nm, resulting in a reduction in the capacitance per unit volume of the activated carbon.

The mode of the pore diameters of the activated carbon can be determined as follows: First, a powder of activated carbon is dispersed in a suitable solvent, and the solution is dropped onto a mesh applied to a microgrid for use with a transmission electron microscope. The solution on the mesh is then dried in the atmosphere, thus producing an observation sample. The observation sample is then imaged at an acceleration voltage of 200 kV by a transmission electron microscope (CM200 manufactured by Philips, with an objective lens having a spherical aberration coefficient Cs=1.2 mm). At this time, the aperture of the objective lens is adjusted to exclude diffraction rays having a larger diffraction angle than the 002 face of graphite and focus the image for thereby cutting off the information that is more specific than the distance of the 002 face of graphite. Then, the produced negative image is read by a film scanner to produce digital image data having an image size of 512×512 pixels and 256 gradations. The produced digital image data is subjected to two-dimensional Fourier transform, and the produced power spectrum is circularly integrated to produce a one-dimensional power spectrum. The one-dimensional power spectrum represents an extracted periodicity of irregularities of the activated carbon, and reflects a distribution of pore diameters of the activated carbon. The value of the center of the Gaussian distribution with which the one-dimensional power spectrum has recurred is used as the mode of pore diameters. The mode of pore diameters thus determined according to the above process will hereinafter be referred to as the mode of pore diameters determined by an image analysis of transmission electron microscope images.

With the above structure, the combination of a nonaqueous electrolytic liquid and a polarized electrode can be optimized to provide an electrochemical capacitor having a low internal resistance, a large capacitance, and a high energy density.

In the electrochemical capacitor, the cations $Q^+$ may comprise organic onium ions represented by $(CH_3)_3(C_2H_5)X^+$ (X=N, P, As) or $(CH_3)_4X^+$ (X=P, As, Sb).

The anions $A^-$ which cooperate with the cations $Q^+$ in forming the electrolytic salt $Q^+A^-$ should preferably comprise fluorine complex ions represented by $MF_n^-$ (M=B, n=4 or M=P, As, Sb, n=6) as a high withstand voltage and a high electric conductivity are achieved when the electrolytic salt $Q^+A^-$ is formed.

The electrolytic salt $Q^+A^-$ for use in the electrochemical capacitor may be any salt that is obtained by the combination of the cations $Q^+$ and the anions $A^+$. However, $(CH_3)_3(C_2H_5)NBF_4$ is particularly preferable because its toxicity is low and its industrial production is easy.

The nonaqueous solvent should preferably comprise propylene carbonate for its high withstand voltage and high electric conductivity, and a wide temperature range in which it can be used.

The nonaqueous electrolytic liquid should preferably be prepared by dissolving $(CH_3)_3(C_2H_5)NBF_4$ as the electrolytic salt $Q^+A^-$ into the propylene carbonate because its toxicity is low and its industrial production is easy, its withstand voltage and electric conductivity are high, and it can be used in a wide temperature range. The nonaqueous electrolytic liquid can be used in a concentration ranging from 0.3 to 3.0 moles/liter. If the concentration of the nonaqueous electrolytic liquid were lower than 0.3 mole/liter, then the electric conductivity of the nonaqueous electrolytic liquid would be lowered, resulting in an increase in the internal resistance of the electro-chemical capacitor. If the concentration of the nonaqueous electrolytic liquid were higher than 3.0 moles/liter, then salt would be precipitated at low temperatures. These drawbacks can reliably be eliminated if the nonaqueous electrolytic liquid is used in a concentration ranging from 0.5 to 2.0 moles/liter.

In the electrochemical capacitor according to the present invention, at least the anode may comprise the polarized electrode, as described above. If more importance is attached to energy capacity, then the anode may comprise a non-polarized electrode of metal oxide, conductive polymer, or the like. If more importance is attached to service life and reliability, then the anode may comprise a polarized electrode. If more importance is attached to the manufacturing cost, then the anode should preferably comprise a polarized electrode of activated carbon.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
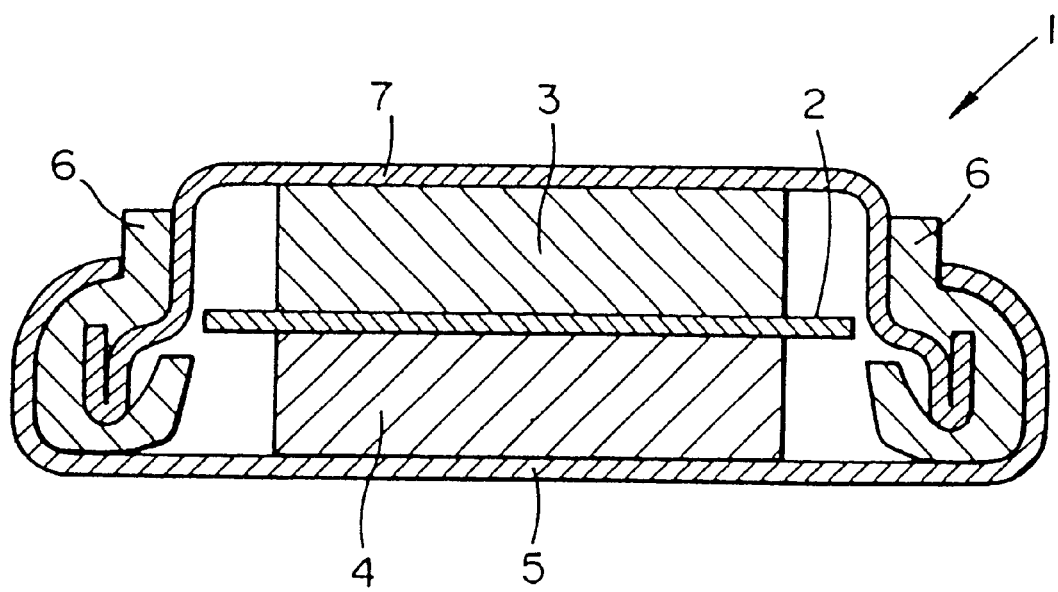
FIG. 1 is a cross-sectional view of an electro-chemical capacitor according to the present invention.

FIG. 1 shows a coin-type electric double-layer capacitor 1 as an electrochemical capacitor according to the present invention. As shown in FIG. 1, the electric double-layer capacitor 1 comprises an anode 3 and a cathode 4 that are disposed in confronting relationship to each other with a separator 2 interposed therebetween and housed in an aluminum casing 5. The anode 3 and the cathode 4 are impregnated with an electrolytic liquid (not shown). The casing 5 is sealed by an aluminum lid 7 with a gasket 6 interposed therebetween.

Each of the anode 3 and the cathode 4 is mainly made of activated carbon kneaded with a conductive agent and a binder, and shaped into a disk. The anode 3 is bonded to an inner surface of the lid 7 by a conductive adhesive, and the cathode 4 is bonded to an inner surface of the casing 5 by a conductive adhesive. The inner surface of the casing 5 serves as a current collector for the cathode 4. The casing 5 has its outer surface for use as a connecting terminal for the cathode 4. The inner surface of the lid 7 serves as a current collector for the anode 3. The lid 7 has its outer surface for use as a connecting terminal of the anode 3.

Figure 2:
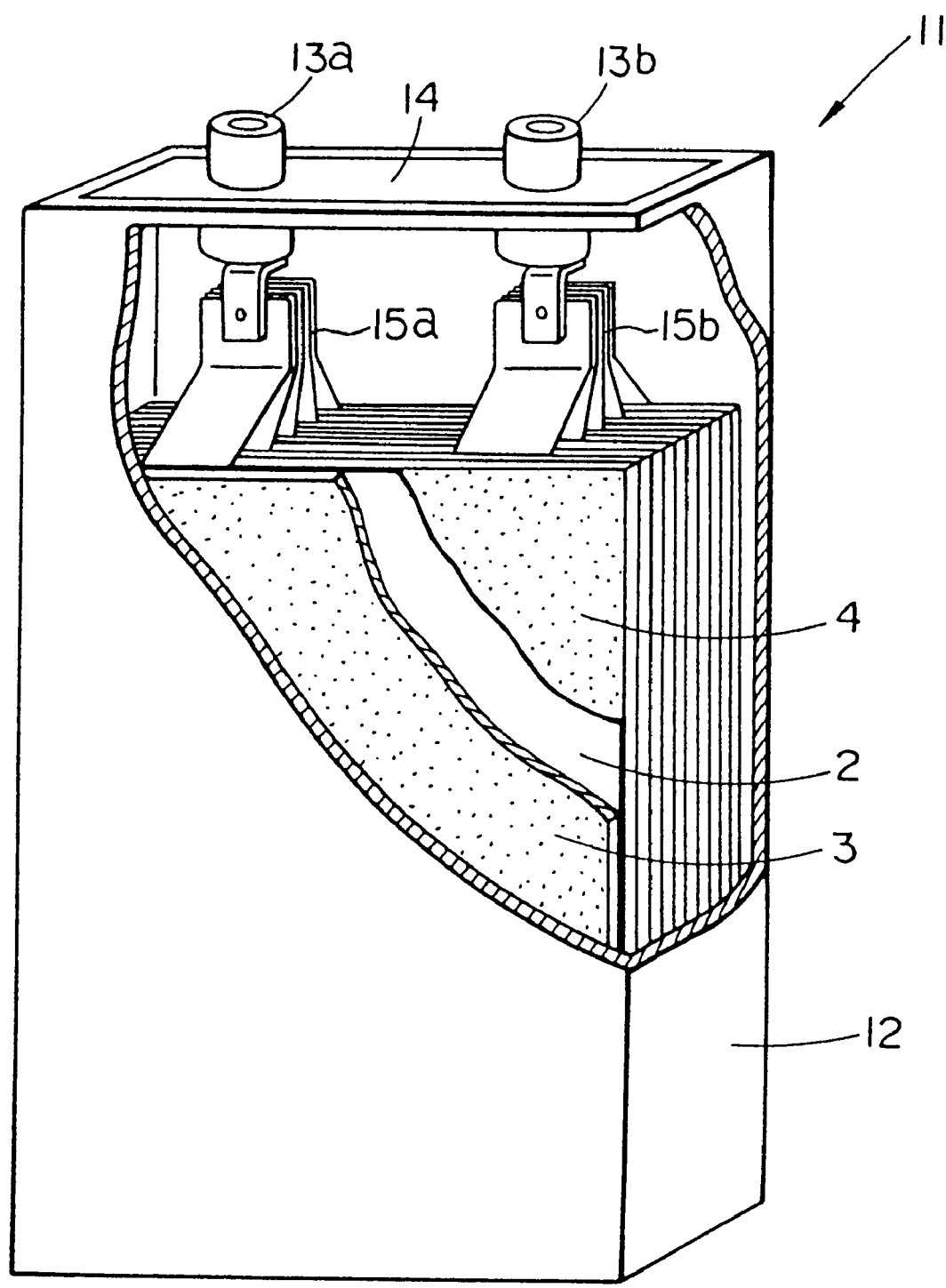
FIG. 2 is a perspective view, partly broken away, of another electrochemical capacitor according to the present invention.

FIG. 2 shows an electric double-layer capacitor 11, which is in the form of a rectangular parallelepiped, as another electrochemical capacitor according to the present invention. As shown in FIG. 2, the electric double-layer capacitor 11 comprises a plurality of electrode elements including anodes 3 and cathodes 4 disposed in confronting relationship to each other with separators 2 interposed therebetween, and housed in an aluminum casing 12 with an insulating member (not shown) around the electrode elements. The anodes 3 and the cathodes 4 are impregnated with an electrolytic liquid (not shown). The casing 12 is sealed by an aluminum lid 14 having a pair of external connection terminals 13a, 13b which are supported on and insulated from the aluminum lid 14 by insulating members (not shown).

Each of the anodes 3 and the cathodes 4 is mainly made of activated carbon kneaded with a conductive agent and a binder, and shaped into a sheet, which is bonded to a current collector (not shown) such as of metal foil by a conductive adhesive. Leads 15a, 15b connected to the current collectors extend from the anodes 3 and the cathodes 4 and connected respectively to the external connection terminals 13a, 13b.

The electrolytic liquid comprises a nonaqueous electrolytic liquid prepared by dissolving an electrolytic salt $Q^+A^-$ including cations $Q^+$ whose van der Waals volume ranges from 0.10 to 0.125 $nm^3$ into a nonaqueous solvent. Since the van der Waals volume of the cations $Q^+$ ranges from 0.10 to 0.125 $nm^3$, the cations $Q^+$ can be diffused relatively freely in pores of the activated carbon of the polarized electrodes of the anodes 3 and the cathodes 4.

Table 1 shown below sets forth the van der Waals volumes of various organic onium ions calculated at an interstitial distance of 0.075 nm, using the conformations determined by the above MM2 calculations.

TABLE 1

| | X | | | |
|---|---|---|---|---|
| | N | P | AS | Sb |
| $(CH_3)_4X^+$ | 0.095 | 0.104 | 0.106 | 0.118 |
| $(CH_3)_3(C_2H_5)X^+$ | 0.111 | 0.120 | 0.122 | 0.134 |
| $(CH_3)_2(C_2H_5)_2X^+$ | 0.129 | 0.138 | 0.140 | 0.152 |
| $(CH_3)(C_2H_5)_3X^+$ | 0.146 | 0.155 | 0.157 | 0.169 |
| $(C_2H_5)_4X^+$ | 0.170 | 0.179 | 0.181 | 0.193 |

It can be seen from Table 1 that organic onium ions represented by $(CH_3)_3(C_2H_5)X^+$ (X=N, P, As) or $(CH_3)_4X^+$ (X=P, As, Sb) satisfy the above condition with respect to the van der Waals volume of the cations. Of the above organic onium ions, preferable are organic onium ions whose central element is an N atom or a P atom for their low toxicity and easy industrial production, and particularly preferable is $(CH_3)_3(C_2H_5)N^+$ for its high solubility and relatively high conductivity.

Anions $A^-$ of the electrolytic salt $Q^+A^-$ including the cations $Q^+$ may be various anions. Of those various anions, preferable are fluorine complex ions represented by $MF_n^-$ (M=B, n=4 or M=P, As, Sb, n=6) which is a conjugate base of a superstrong acid $HMF_4$ for their high withstand voltage and high electric conductivity. Of the fluorine complex ions, preferable are $BF_4^-$, $PF_6^-$ for their easy industrial production and low toxicity, and particularly preferable is $BF_4^-$ for its excellent stability against hydrolysis.

The nonaqueous solvent into which the electrolytic salt $Q^+A^-$ is dissolved may be one or a mixture of cyclic carbonates including ethylene carbonate, propylene carbonate, butylene carbonate, etc., chain carbonates including dimethyl carbonate, ethyl methyl carbonate, diethyl carbonate, etc., cyclic ester carboxylates including γ-butyrolactone, γ-valerolactone, etc., chain ester carboxylates including methyl acetate, methyl propionate, etc., nitryles including acetonitrile, glutaronitrile, adiponitrile, methoxyacetonitrile, 3-methoxypropionitrile, etc., and aprotic solvents including sulfolane, trimethylphosphate, etc. Of these solvents, particularly preferable is propylene carbonate for its high withstand voltage and high electric conductivity, and a wide temperature range in which it can be used.

The nonaqueous electrolytic liquid can be used in a concentration ranging from 0.3 to 3.0 moles/liter. However, in order to reliably prevent the electric conductivity of the nonaqueous electrolytic liquid from being lowered and also to reliably prevent the salt from being precipitated at low temperatures, the nonaqueous electrolytic liquid is used in a concentration ranging from 0.5 to 2.0 moles/liter.

Since water mixed with the electrolytic liquid. tends to reduce the withstand voltage, the water content of the electrolytic liquid is kept at 200 ppm or less, preferably 100 ppm or less, more preferably 50 ppm or less, or particularly preferably 30 ppm or less.

The electrolytic liquid may comprise only an electrolytic salt $Q^+A^-$ including cations $Q^+$ whose van der Waals volume ranges from 0.10 to 0.125 $nm^3$, such as ethyl trimethyl ammonium tetrafluoroborate, or may comprise a mixture of such an electrolytic salt and another electrolytic salt including cations $Q^+$ whose van der Waals volume is greater than 0.125 $nm^3$.

Since the pores of the activated carbon are not of a uniform diameter, but include various pores ranging from small to large pores, the electrolytic liquid comprising the mixture of the above electrolytic salt and the other electrolytic salt including cations $Q^+$ whose van der Waals volume is greater than $0.125$ nm$^3$ is effective to utilize pores of relatively large diameters in the activated carbon in order to increase the capacitance.

In the electrochemical capacitor according to the present embodiment, the polarized electrodes used as the anode 3 and the cathode 4 are mainly made of activated carbon kneaded with a conductive agent and a binder, and shaped into a sheet or plate because activated carbon is electrochemically inactive with respect to the nonaqueous electrolytic liquid, has appropriate electric conductivity, and has a large electrode interface where electric charges are stored.

The activated carbon should preferably have small modes of pore diameters determined by an image analysis of transmission electron microscope images thereof in order to increase the capacitance per volume insofar as the pores can provide a passage for the cations $Q^+$ to be diffused freely therein. In order for the cations $Q^+$ to function effectively, it is necessary that the modes of pore diameters determined by an image analysis of transmission electron microscope images be $1.5$ nm or less. In order to further increase the capacitance per volume, the modes of pore diameters should preferably be $1.4$ nm or less, and should particularly preferably be $1.3$ nm or less.

The specific surface area of the activated carbon cannot generally be specified for the reasons of the capacitance (F/m$^2$) per unit area depending on the type of carbon and a reduction in the bulk density due to an increase in the specific surface area. In order to obtain the above properties, the specific surface area as determined by a BET processed based on the nitrogen adsorption method should preferably be in the range of $80$ to $2500$ m$^2$/g, and particularly preferably in the range of $1000$ to $2000$ m$^2$/g to increase the capacitance per unit volume.

The activated carbon with the pores may be manufactured by any process. Generally, however, the activated carbon is manufactured by carbonizing any of various materials including a plant-based material such as wood, sawdust, coconut shell, or pulp waste liquid, a fossil fuel such as coal, heavy-duty petroleum oil, coal- or petroleum-based pitch produced by thermally decomposing coal or heavy-duty petroleum oil, petroleum coke, carbon aerogel, fibers produced by spinning tar pitch, synthetic polymer, phenolic resin, furan resin, polyvinyl chloride resin, polyimide resin, polyamide resin, liquid crystal polymer, plastic waste, waste tires, or the like, and then activating the carbonized material. The carbonized material is activated by a gas activating process or a chemical activating process. According to the gas activating process, the carbonized material is brought into contact with steam, carbon dioxide gas, oxygen, or another oxidizing gas for reaction therewith. According to the chemical activating process, the carbonated material is uniformly impregnated with a chemical such as zinc chloride, phosphoric acid, sodium phosphate, calcium chloride, potassium sulfide, potassium hydroxide, potassium carbonate, sodium carbonate, sodium sulfate, calcium carbonate, or the like, and then heated in an inactive gas atmosphere to produce activated carbon by dehydrating and oxidizing the chemical. The activated carbon according to the present embodiment may be produced by carbonizing an easily graphitizable resin, for example, and activating the carbonized resin with potassium hydroxide.

After being activated, the activated carbon is heated in a temperature range of $500$ to $2500°$ C., preferably $700$ to $1500°$ C. in an inactive atmosphere of nitrogen, argon, helium, xenon, or the like, to remove an unwanted surface functional group and develop a carbon crystal for increased electric conductivity.

The activated carbon is not limited to any shapes. The activated carbon may be in any of various shapes including crushed fragments, granular form, fiber, felt, woven cloth, sheet, etc., and shaped into a sheet or plate. If the activated carbon is used in granular form, then it is preferable for the activated carbon to have an average particle diameter of $30$ $\mu$m or less in order to increase the bulk density of the electrodes formed thereof and to reduce the internal resistance thereof.

The conductive agent may be at least one material selected from the group consisting of carbon black such as acetylene black, Ketchen black, or the like, natural graphite, thermally expanded graphite, carbon fibers, or metal fibers of ruthenium oxide, titanium oxide, aluminum, or nickel. The conductive agent should preferably be acetylene black or Ketchen black because it can effectively increase the electric conductivity when added in a small quantity. The proportion of the conductive agent with respect to the activated carbon differs depending on the bulk density of the activated carbon. If the proportion of the conductive agent is too large, then the proportion of the activated carbon is reduced to reduce the capacitance. Therefore, the proportion of the conductive agent is suitably in the range of $5$ to $50$ weight % of the weight of the activated carbon. Preferably, the proportion of the conductive agent should be in the range of $10$ to $30$ weight % of the weight of the activated carbon in order to maintain a desired level of capacitance.

The binder may be one or more of polytetrafluoroethylene, polyvinylidene fluoride, carboxymethyl cellulose, fluoroolefin coplymeric crosslinked polymer, polyvinyl alcohol, polyacrylic acid, polyamide, petroleum pitch, coal pitch, tar, and phenolic resin. The proportion of the binder with respect to the activated carbon differs depending on the type and shape of the activated carbon. If the proportion of the binder is too large, then the proportion of the activated carbon is reduced to reduce the capacitance. If the proportion of the binder is too small, then the binding ability thereof is reduced for the activated carbon to fail to achieve a desired level of strength. Therefore, the proportion of the binder is suitably in the range of $0.5$ to $30$ weight % of the weight of the activated carbon. Preferably, the proportion of the binder should be in the range of $2$ to $30$ weight % of the weight of the activated carbon in order to maintain a desired level of capacitance.

The polarized electrodes can be formed according to a conventional process. For example, the activated carbon and acetylene black are mixed together, and polytetrafluoroethylene is added to the mixture, which is then pressed to shape. Alternatively, the activated carbon and a binder such as pitch, tar, phenolic resin, or the like are mixed together and shaped, after which the shaped body is heated in an inactive atmosphere to produce a sintered body. It is possible to sinter only the activated carbon.

In the present embodiment, the anode 3 and the cathode 4 are made of the same activated carbon. However, the activated carbon of the anode 3 may not necessarily be the same as the activated carbon of the cathode 4, but may have substantially the same specific surface area as the activated carbon of the cathode 4. In this modification, the anode 3 may be formed in the same manner as with the cathode 4.

In the present embodiment, the electrochemical capacitor according to the present invention has been described as an electric double-layer capacitor having an anode(s) 3 and a cathode(s) 4 each comprising a polarized electrode. However, the electrochemical capacitor according to the present invention may comprise a pseudo capacitor actor having an anode 3 comprising a non-polarized electrode. The non-polarized electrode may be any of various non-polarized electrodes that can be doped with anions of a metal oxide such as ruthenium oxide, iridium oxide, nickel oxide, lead oxide, or the like, or a conductive polymer such as polypyrrole, polythiophene, or the like, or amorphous carbon, crystalline graphite, or the like.

Inventive and comparative examples of the present embodiment will be described below.

INVENTIVE EXAMPLE 1

To 80 parts by weight of activated carbon, there were added 10 parts by weight of a binder of polytetrafluoroethylene and 10 parts by weight of a conductive filler of carbon black. The mixture was kneaded and pressed into a disk-shaped electrode having a diameter of 20 mm and a thickness of 0.4 mm. Using the disk-shaped electrode as each of the anode 3 and the cathode 4, the anode 3 and the cathode 4 were disposed in confronting relationship to each other with a separator 2 of paper interposed therebetween, and the assembly was placed in an aluminum casing 5, as shown in FIG. 1.

Figure 3:
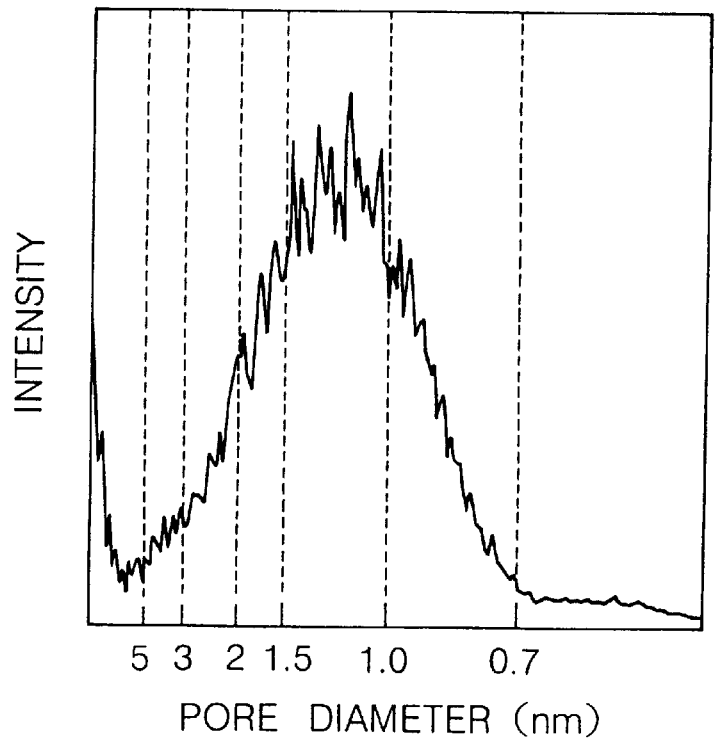
FIGS. 3(a) and 3(b) are graphs showing mode of pore diameters determined by an image analysis of transmission electron microscope images of activated carbon used in polarized electrodes.
Figure 3:
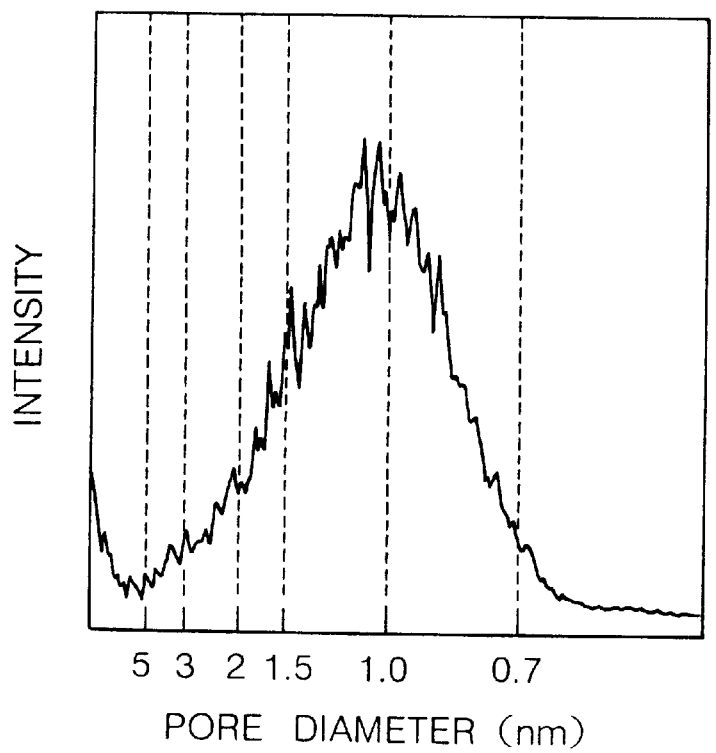

The activated carbon had a mode of 1.24 nm of pore diameters determined by an image analysis of transmission electron microscope images thereof. The distribution of the pore diameters determined by the image analysis of the transmission electron microscope images of the activated carbon is shown in FIG. 3(*a*).

A propylene carbonate solution of ethyl trimethyl ammonium tetrafluoroborate $((CH_3)_3(C_2H_5)NBF_4)$ having a concentration of 1.4 moles/liter was prepared as an electrolytic liquid. The van der Waals volume of ethyl trimethyl ammonium cation as determined by MM2 calculations was 0.111 $nm^3$ as shown in Table 1. The electrolytic liquid was filled in the casing 5, impregnating the anode 3 and the cathode 4. The casing 5 was sealed by an aluminum lid 7 with a gasket 6 interposed therebetween, thus producing an electric double-layer capacitor having the structure shown in FIG. 1.

The electric double-layer capacitor was charged and discharged at a constant current with current densities of 1.6 $mA/cm^2$ and 8 $mA/cm^2$, and measured for an capacitance density and a resistance as performance indicators. The capacitance density was calculated by dividing the capacitance determined from the total energy discharged from the electric double-layer capacitor by the sum volume of the anode 3 and the cathode 4. The resistance was determined from a voltage drop across the electric double-layer capacitor in an initial stage of the discharging of the electric double-layer capacitor. The capacitance density and the resistance of the electric double-layer capacitor according to Inventive Example 1 are shown in Table 2, see below.

COMPARATIVE EXAMPLE 1

An electric double-layer capacitor having the structure shown in FIG. 1 was produced in the same manner as with Inventive Example 1 except that a propylene carbonate solution of triethyl methyl ammonium tetrafluoroborate $((CH_3)(C_2H_5)_3NBF_4)$ having a concentration of 1.4 moles/liter was used as an electrolytic liquid. The van der Waals volume of triethyl methyl ammonium cation as determined by MM2 calculations was 0.146 $nm^3$ as shown in Table 1.

The electric double-layer capacitor was charged and discharged at a constant current under the same conditions as with Inventive Example 1, and measured for an capacitance density and a resistance as performance indicators. The capacitance density and the resistance of the electric double-layer capacitor according to Comparative Example 1 are shown in Table 2, see below.

COMPARATIVE EXAMPLE 2

An electric double-layer capacitor having the structure shown in FIG. 1 was produced in the same manner as with Inventive Example 1 except that a propylene carbonate solution of diethyl dimethyl ammonium tetrafluoroborate $((CH_3)_2(C_2H_5)_2NBF_4)$ having a concentration of 1.4 moles/liter was used as an electrolytic liquid. The van der Waals volume of triethyl methyl ammonium cation as determined by MM2 calculations was 0.129 $nm^3$ as shown in Table 1.

The electric double-layer capacitor was charged and discharged at a constant current under the same conditions as with Inventive Example 1, and measured for an capacitance density and a resistance as performance indicators. The capacitance density and the resistance of the electric double-layer capacitor according to Comparative Example 2 are shown in Table 2, see below.

INVENTIVE EXAMPLE 2

An electric double-layer capacitor having the structure shown in FIG. 1 was produced in the same manner as with Inventive Example 1 except that the mode of pore diameters determined by an image analysis of transmission electron microscope images of the activated carbon was 1.08 nm. The distribution of the pore diameters determined by the image analysis of the transmission electron microscope images of the activated carbon is shown in FIG. 3(*b*).

The electric double-layer capacitor was charged and discharged at a constant current under the same conditions as with Inventive Example 1, and measured for a capacitance density and a resistance as performance indicators. The capacitance density and the resistance of the electric double-layer capacitor according to Inventive Example 2 are shown in Table 2, see below.

COMPARATIVE EXAMPLE 3

An electric double-layer capacitor having the structure shown in FIG. 1 was produced in the same manner as with Inventive Example 2 except that a propylene carbonate solution of triethyl methyl ammonium tetrafluoroborate $((CH_3)(C_2H_5)_3NBF_4)$ having a concentration of 1.4 moles/liter was used as an electrolytic liquid.

The electric double-layer capacitor was charged and discharged at a constant current under the same conditions as with Inventive Example 1, and measured for a capacitance density and a resistance as performance indicators. The capacitance density and the resistance of the electric double-layer capacitor according to Comparative Example 3 are shown in Table 2, see below.

COMPARATIVE EXAMPLE 4

An electric double-layer capacitor having the structure shown in FIG. 1 was produced in the same manner as with Inventive Example 2 except that a propylene carbonate solution of diethyl dimethyl ammonium tetrafluoroborate $((CH_3)_2(C_2H_5)_2NBF_4)$ having a concentration of 1.4 moles/liter was used as an electrolytic liquid.

The electric double-layer capacitor was charged and discharged at a constant current under the same conditions as with Inventive Example 1, and measured for a capacitance density and a resistance as performance indicators. The capacitance density and the resistance of the electric double-layer capacitor according to Comparative Example 4 are shown in Table 2, see below.

TABLE 2

|  |  | In. Ex. 1 | Co. Ex. 1 | Co. Ex. 2 | In. Ex. 2 | Co. Ex. 3 | Co. Ex. 4 |
|---|---|---|---|---|---|---|---|
| Van der Waals volume of cations (nm$^3$) | | 0.111 | 0.146 | 0.129 | 0.111 | 0.146 | 0.129 |
| Mode of pore diameters of activated carbon (nm) | | 1.24 | 1.24 | 1.24 | 1.08 | 1.08 | 1.08 |
| Current density: 1.6 mA/cm$^2$ | Capacitance density (F/ml) | 21.9 | 21.9 | 21.9 | 22.9 | 22.0 | 22.5 |
| | Resistance ($\Omega$) | 1.97 | 2.74 | 3.96 | 4.52 | 5.90 | 8.69 |
| Current density: 8 mA/cm$^2$ | Capacitance density (F/ml) | 21.7 | 21.0 | 19.0 | 21.8 | 20.0 | 18.7 |
| | Resistance ($\Omega$) | 2.88 | 3.31 | 5.35 | 5.26 | 7.73 | 7.87 |

As can be understood from Table 2, the resistance is lower with Inventive Examples than with Comparative Examples if the mode of pore diameters and the condition for constant-current charging and discharging are the same. This appears to be because the van der Waals volume of the cations of the electrolytic salt in each of Inventive Examples is smaller than the van der Waals volume of the cations of the electrolytic salt in each of Comparative Examples, and hence is more advantageous for the diffusion in the pores of the activated carbon.

The capacitance density is higher with Inventive Examples than with Comparative Examples if the mode of pore diameters and the condition for constant-current charging and discharging are the same. Particularly, in Inventive Example 2 which used activated carbon whose mode of pore diameters is smaller than the mode of pore diameters of Inventive Example 1, the capacitance is much greater than those of Comparative Examples 3, 4 if the current density in constant-current charging and discharging is the same. In Inventive Example 1, the capacitance is much greater than those of Comparative Examples 3, 4 if the current density is of a greater value of 8 mA/cm$^2$.

Therefore, it has been confirmed that using an electrolytic liquid including cations whose van der Waals volume is in the range of 0.10 to 0.125 nm$^3$ (Inventive Examples 1, 2) is effective in reducing the resistance of an electric double-layer capacitor and increasing the capacitance thereof. The above electrolytic liquid is particularly effective in reducing the resistance of an electric double-layer capacitor when a large current is discharged from the electric double-layer capacitor. It is apparent that the electrolytic liquid including cations whose van der Waals volume is in the above range is particularly effective in increasing the capacitance in combination with activated carbon with smaller pore diameters.

Although certain preferred embodiments of the present invention have been shown and described in detail, it should be understood that various changes and modifications may be made therein without departing from the scope of the appended claims.

What is claimed is:

1. An electrochemical capacitor comprising:
   electrode elements as an anode and a cathode that are disposed in confronting relationship to each other with a separator interposed therebetween; and
   a nonaqueous electrolytic liquid impregnated in said electrode elements;
   said nonaqueous electrolytic liquid being prepared by dissolving an electrolytic salt $Q^+A^-$ including cations $Q^+$ whose van der Waals volume ranges from 0.10 to 0.125 nm$^3$ into a nonaqueous solvent;
   said cathode comprising a polarized electrode made of activated carbon having pore diameters whose mode is at most 1.5 nm.

2. An electrochemical capacitor according to claim 1, wherein said cations $Q^+$ comprise organic onium ions represented by $(CH_3)_3(C_2H_5)X^+$ (X=N, P, As) or $(CH_3)_4X^+$ (X=P, As, Sb).

3. An electrochemical capacitor according to claim 1, wherein said anions $A^-$ comprise fluorine complex ions represented by $MF_n^-$ (M=B, n=4 or M=P, As, Sb, n=6).

4. An electrochemical capacitor according to claim 3, wherein said electrolytic salt $Q^+A^-$ are represented by $(CH_3)_3(C_2H_5)NBF_4$.

5. An electrochemical capacitor according to claim 1, wherein said nonaqueous solvent comprises propylene carbonate.

6. An electrochemical capacitor according to claim 5, wherein said nonaqueous electrolytic liquid is prepared by dissolving $(CH_3)_3(C_2H_5)NBF_4$ as said electrolytic salt $Q^+A^-$ in a concentration ranging from 0.5 to 2.0 moles/liter into the propylene carbonate.

7. An electrochemical capacitor according to claim 1, wherein said anode comprises a polarized electrode made of activated carbon.

* * * * *